United States Patent [19]

DeVincentiis et al.

[11] 3,887,798

[45] June 3, 1975

[54] GENERATOR OF PULSE TRAINS CORRESPONDING TO WALSH FUNCTIONS

[75] Inventors: Girolamo DeVincentiis, San Mauro Torinese; Angelo Luvison, all of Turin, Italy

[73] Assignee: CSELT-Centro Studi E Laboratori Telecomunicazioni s.p.a., Torino, Italy

[22] Filed: Dec. 17, 1973

[21] Appl. No.: 425,132

[52] U.S. Cl. ..... 235/152; 179/15 BC; 340/347 DD; 340/348

[51] Int. Cl. .......................................... H03k 13/24

[58] Field of Search ................ 235/152; 179/15 BC; 340/348, 347 DD; 178/68; 325/38 R

[56] References Cited

UNITED STATES PATENTS

| | | | |
|---|---|---|---|
| 3,618,077 | 11/1971 | Peterson | 340/348 |
| 3,701,143 | 10/1972 | Nacht | 340/347 DD |
| 3,795,864 | 3/1974 | Fullton, Jr. | 325/38 R |

OTHER PUBLICATIONS

Anthony C. Davies, "On the Definition & Generation of Walsh Function" IEEE Trans. on Computers, Feb. 1972, pp. 187–9.

Karl-Hans Siemens & Reuvenkitai, "Digital Walsh-Fourier Analysis of Periodic Waveforms," IEEE Trans. on Instr. & Measurement, Dec. 1969, pp. 316–321.

G. Robert Redinbo, "An Implementation Technique For Walsh Function" IEEE Trans. on Computers, June 1971, pp. 706–7.

*Primary Examiner*—Eugene G. Botz
*Assistant Examiner*—David H. Malzahn
*Attorney, Agent, or Firm*—Karl F. Ross; Herbert Dubno

[57] ABSTRACT

To generate pulse trains corresponding to the binary representation of numbers in the so-called Walsh code, the numbers ranging from 1 to $m-1$ where $m = 2^{k+1}$, a logic network RC1 with $k+1$ inputs and $m$ outputs converts a selected binary number into the equivalent Walsh function whose bits are stored on associate flip-flops 501 – 516 forming respective stages of a dynamic memory. Another logic network RC2 determines the highest-ranking finite bit (1) of the selected binary number and, according to the rank thereof, selects one of $k+1$ subharmonically related pulse frequencies in the output of a frequency divider to step the dynamic memory at a cadence corresponding to that rank and to read out in series the contents of a corresponding number of pairs of memory stages, representing the stored Walsh function, the read-out recurring continuously until the next selection as the stored bits are recirculated in the memory 501 – 516.

8 Claims, 5 Drawing Figures

| I<br>n | II<br>18/20 | III<br>19/21 | IV<br>UD2 | V<br>UD1 |
|---|---|---|---|---|
| 1 (p=1) | 0 | 0 | 30 | 51 |
| 2, 3 (p=2) | 0 | 1 | 29 | 52 |
| 4 - 7 (p=3) | 1 | 1 | 28 | 53 |
| 8-15 (p=4) | 1 | 0 | 27 | 54 |

FIG. 3

| n | $a'_3$ | $a'_2$ | $a'_1$ | $a'_0$ |
|---|---|---|---|---|
| 1 (p=1) | 1 | [1] | [0] | [1] |
| 2, 3 (p=2) | 1 | $a_0$ | [0] | [$a_0$] |
| 4 - 7 (p=3) | 1 | $a_1$ | $a_0$ | [$a_0$] |
| 8-15 (p=4) | 1 | $a_2$ | $a_1$ | $a_0$ |

FIG. 5

GENERATOR OF PULSE TRAINS CORRESPONDING TO WALSH FUNCTIONS

FIELD OF THE INVENTION

Our present invention relates to a system for the generation of binary pulse trains, or square waves, with assigned numerical values in a range from 1 through $m-1$ with $m = 2^{k+1}$ ($k$ being an integer) in accordance with the so-called Walsh code.

BACKGROUND OF THE INVENTION

Walsh functions are expanded binary representations of numerical values containing a certain amount of redundancy designed to facilitate error-free transmission over a line or a radio link. Inherent symmetry or antisymmetry allows the correctness of transmission to be readily verified; in particular, they consist of an alternation between two voltage levels, e.g., 1/0 or +1/−1, any pulse of one level being paired with an immediately adjoining pulse of the other level having the same width. All functions invariably start at the same level, referred to hereinafter as +1; they are conveniently transmitted by direct current over metallic circuits and, if their starting points and the length of each pulse sequence are known, can be easily identified by suitable receiving equipment. Further reference in this connection may be made to SIAM (Society of Industrial and Applied Mathematics) Review, volume 12, No. 1; January 1970, page 131.

Systems hitherto designed to synthesize such Walsh functions have operated on the principle of progression through all the lower-order functions to the one desired, with intermediate storage of at least some of these precursor functions. This mode of operation required relatively complex and therefore costly equipment.

OBJECTS OF THE INVENTION

The general object of our present invention is to provide a simplified system for generating pulse trains corresponding to the Walsh functions of selected numbers.

More particularly, our invention aims at providing a system of this type generating such pulse trains in a noniterative manner, i.e., without replication of lower-order functions, enabling the several bits of each function to be serially transmitted (in the form of two different voltage levels as discussed above) virtually instantaneously upon selection of the number to be so coded.

It is also an object of our invention to provide means in such a system for recurrently reading out the selected Walsh function over an indefinite period, e.g., until the selection of the next number to be coded.

SUMMARY OF THE INVENTION

The pulse-generating system according to our invention comprises a logic circuit with $k+1$ input leads and with up to $m$ output leads, the input leads being selectively energizable to represent a chosen binary number which is converted by this circuit into its equivalent Walsh function represented by the energization of certain of its output leads. These output leads are connectable to respective stages of an $m$-stage memory having stepping inputs energizable, under the control of a switching network, from a source of $k+1$ pulse sequences with different repetition frequencies or cadences which are subharmonically related to a basic frequency $f$; the term "subharmonically related," as used in this context, encompasses the factors $2^0, 2^{-1}, \ldots 2^{-k}$ so that the highest repetition frequency may be the pulse cadence $f$ itself, the other cadences being derived therefrom through a binary frequency divider. A switching circuit, which for convenience may be split into two separate networks, is connected to the aforementioned input leads for determining from their energization pattern the rank $p$ of the highest-ranking finite bit (1) of the chosen binary number and for completing an output circuit over which the contents of a group of $2^p$ consecutive memory stages are read out under the control of the pulse source applying a pulse sequence of repetition frequency $f/2^{k+1-p}$ to the stepping inputs of these stages.

According to a more particular feature of our invention, the memory is provided with a feedback path extending from its output to its first stage for periodically recirculating the contents of the selected $2^p$ stages with an invariable recurrence period $T = m/f$, this period corresponding to the duration of any pulse sequence read out from the memory as a Walsh function of the selected binary number. To facilitate such recirculation, we prefer to provide the memory with interstage switchover means in the form of electronic switches initially settable to connect the several stages to the $m$ output leads of the logic circuit, the switchover means being operable by a start switch to disconnect the memory stages from the associated output leads and to connect them in cascade with one another and with the feedback path. Another switch serves to reset these interstage switches, preparatorily to reoperation of the start switch upon selection of a new number, in order to reconnect the memory stages to the respective output leads of the logic circuit.

Advantageously, the start switch does not directly reverse the interstage switches but activates the pulse source for applying a first stepping pulse to each memory stage in order to load same with the bits represented by the potentials of the associated output leads of the logic circuit. After a short delay, this first stepping pulse is applied to a supply of control voltage for the switchover means in order to connect the several memory stages of the selected group in cascade with one another for recirculation of the stored Walsh function.

The logic circuit, which for convenience may also be split into two networks respectively controlling the two switching networks, may comprise a binary multiplier for upshifting the bits of the selected number by $k+1-p$ digital positions, these upshifted bits being fed to a coding matrix for energizing the $m$ output leads in the pattern of the corresponding Walsh function. In order to carry out the specific algorithm for generating these functions as described below, the coding matrix advantageously comprises a set of Exclusive-OR gates.

In the particular embodiment described hereinafter, the individually selectable numerical values range from 1 through 15, with $m = 16$ and $k = 3$. The logic circuit thus has four input leads and 16 output leads, the bits on these output leads being storable in 16 flip-flops constituting the several stages of the dynamic memory of our system. The group of active memory stages then consists of one, two, four or eight pairs of consecutive flip-flops, depending upon the rank $p$ of the highest-ranking unity bit in the binary representation of the selected numerical value $m$.

BRIEF DESCRIPTION OF THE DRAWING

The above and other features of our invention will now be described in detail with reference to the accompanying drawing in which:

FIG. 3 is a table explaining the operation of a pair of switching networks included in the system of FIG. 2;

FIG. 5 is a table explaining the operation of a binary multiplier included in the circuit of FIG. 4.

SPECIFIC DESCRIPTION

Any number n <m (with m = $2^{k+1}$) can be represented in binary form by $$n = a_k 2^k + a_{k-1} 2^{k-1} + \ldots + a_1 2^1 + a_0 2^0 \quad (1)$$

where each of the coefficients $a_k$, $a_{k-1}$ etc. can be either 1 or 0. For numbers greater than 0, at least one of these coefficients has the finite value 1; the most significant term having such a finite coefficient is assigned the rank $p$. Thus, $p = 1$ for $n = 1$; $p = 2$ for $n = 2$ or 3; and so forth to $p = k + 1$ for $n \geqq 2^k$.

Figure 1:
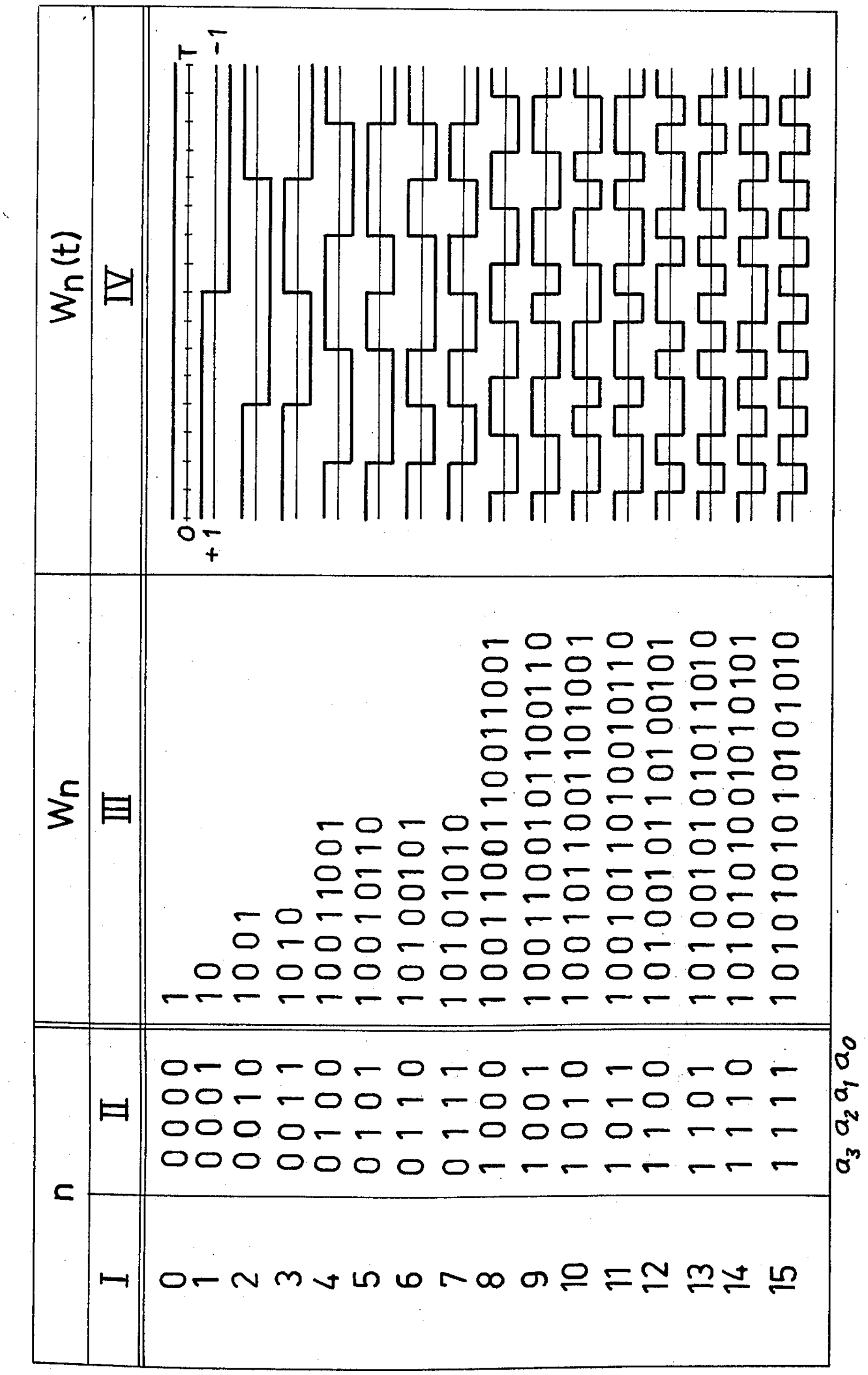
FIG. 1 is a table of the cardinal numbers 1 – 15 in decimal, binary and Walse-code representation, also showing a set of pulse trains representing the several Walsh functions.

In FIG. 1 we have shown, both in decimal notation (column I) and in binary code (column II), the several values of $n$ ranging from 0 through 15. Column II also indicates the coefficients $a_0$ – $a_3$ for these 16 values. Column III gives the corresponding Walsh functions $w_n$ in digital form whereas column IV depicts their equivalents as functions of time $w_n(t)$. Except for the function $w_0(t)$ in the top graph of column IV, which has been included only for the sake of completeness, all the functions $w_n(t)$ are pulse trains composed of segments of square waves alternating between two voltage levels +1 and −1. Function $w_0(t)$ is a steady voltage, here positive, and need not concern us any further.

The following general comments may be made for all the functions $w_n(t)$ with $n$ a finite number:

a. The functions all have a common period T.

b. Period T is subdivided into $2^p$ intervals, i.e., two intervals in the case of functions $w_1(t)$, four intervals in the case of functions $w_2(t)$ and $w_3(t)$, eight intervals in the case of functions $w_4(t) - w_7(t)$, and sixteen intervals in the case of the remaining functions $w_8(t) - w_{15}(t)$. The 16 intervals of function $w_{15}(t)$ (bottom graph in column IV) are respective half-cycles of a square wave of frequency $f/2$ which corresponds to half the basic repetition frequency $f$ referred to above. The waveforms of functions $w_7(t)$, $w_3(t)$ and $w_1(t)$ represent respective submultiples $f/4$, $f/8$ and $f/16$ of this basic frequency.

c. In the first interval of each function $w_n(t)$, i.e., between $t = 0$ and $t = T/2^p$, the function has a constant positive value representing the bit 1 in column III. In the second interval of like duration, i.e., up to the point $t = T/2^{p-1}$, the function has a constant negative value representing the bit 0 in column III. This part of the function, therefore, is antisymmetrical about the point $t = T/2^p$. Other aliquot fractions of the function are either symmetrical or antisymmetrical about points $t = T/2^{p-1}$, $t = T/2^{p-2}$ etc., the function as a whole being also symmetrical or antisymmetrical about its midpoint $t = T/2$. A comparison between columns III and IV shows that the symmetry or antisymmetry results from a duplication of bit groups in their original or complemented form, respectively.

Let us consider, for example, the specific case of $n = 13$. This number is written in binary form as 1101 so that its highest-ranking finite bit is in the fourth position ($p = 4$), its coefficients being $a_3 = 1$, $a_2 = 1$, $a_1 = 0$ and $a_0 = 1$. Its fundamental period T is divided into $2^p = 16$ intervals each having a length of T/16. The first eighth of the function, lying within the first two intervals, is antisymmetrical about its midpoint $t = T/16$. The first quarter of the function, occupying the first four intervals, is antisymmetrical about its midpoint $t = T/8$. The first half of the function, coinciding with the first eight intervals, is symmetrical about its midpoint $t = T/4$. The entire function is antisymmetrial about its midpoint $t = T/2$. Since these midpoints can be generally defined by the expression $t = T/2^{i+1}$, with $i = 0, 1, \ldots k$, it will be apparent that the question of symmetry or antisymmetry of a constituent segment of the function is determined by the value of the corresponding coefficient $a_i$; thus, the segment is symmetrical with $a_i = 0$ and antisymmetrical with $a_i$ 32 1. Since, by definition, $a_{p-1} = 1$, there is always antisymmetry about the point $t = T/2^p$.

Figure 2:
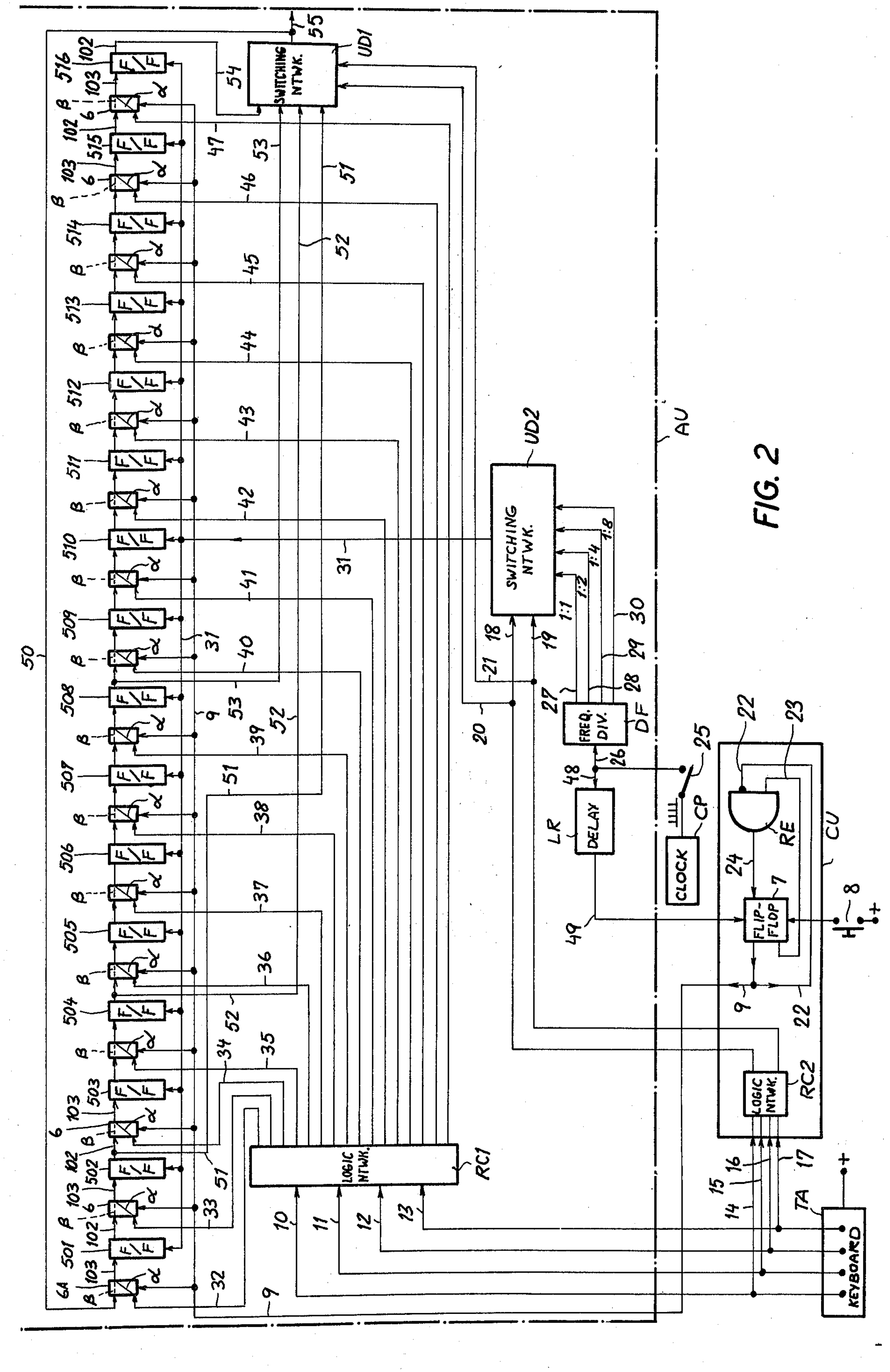
FIG. 2 is an overall block diagram of a system for generating the Walsh functions of FIG. 1 in accordance with our invention.

Reference will now be made to FIG. 2 for a description of a pulse-generating system designed to produce the waveforms of FIG. 1, column IV, in response to respective input signals representing the selected numerical values in binary form. A keyboard TA serves for the selective energization of four conductors 10, 11, 12, 13 in accordance with the chosen binary number, with concurrent energization of leads 10, 11 and 13 in the specific instance ($n$ =13) discussed above. It will be understood that keyboard TA could carry up to 15 pushbuttons or the like bearing the decimal equivalents of these binary numbers or any other set of characters having the numerical values 1 through 15 assigned to them, the selective energization of wires 10 – 13 being then carried out through a conventional binary coder.

Figure 4:
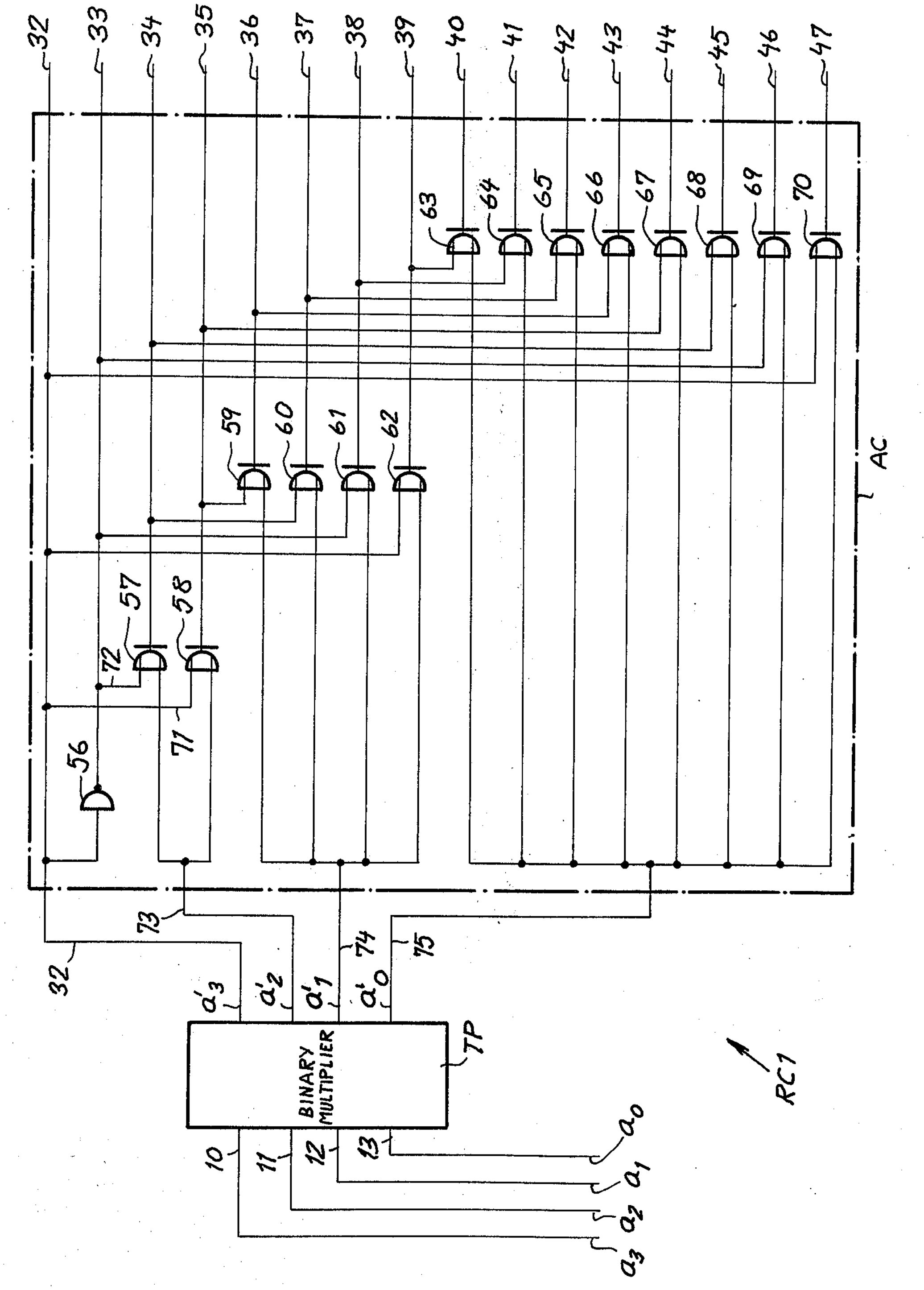
FIG. 4 is a more detailed diagram of a logic circuit forming part of that system.

Conductors 10 – 13 are the input leads of a logic network RC1 forming part of an arithmetic unit AU. Network RC1, described more fully below with reference to FIG. 4, translates the binary code of FIG. 1 (column II) into the Walsh code of column III thereof. Circuit RC1 has 16 output leads 32 – 47 extending to respective flip-flops 501–516 through associated switches which have been generally designated 6 in the case of flip-flops 502–516, the corresponding switch associated with the first flip-flop 501 being referenced 6A. These switches, which (like others referred to hereinafter) are of the electronic type, have been schematically illustrated as having two positions $\alpha$ and $\beta$, the former being the normal or quiescent position in which the output leads 32 – 47 are through-connected to respective biasing inputs 103 or the associated flip-flops. The flip-flops are also provided with stepping inputs, connected to a common bus bar 31, whose energization places or maintains each flip-flop in either its set or its reset state, depending on whether its biasing input 103 is energized or not. Upon being set, the flip-flop energizes an output 102 which in the off-normal position of the following switch 6 is joined to the biasing input 103 of the flip-flop next in the chain; in the case of the last flip-flop 516, its output 102 is directly connected to an iinput lead 54 of a switching network UD1 provided with an output lead 55. A feedback path 50 extends from that output lead back to the switch 6A for connection to input 103 of flip-flop 501 in the off-normal position of that switch. Flip-flops 501–516 thus constitute respective stages of a 16-stage dynamic memory.

Conductors 10 – 13 have branches 14 – 17 extending to another logic network RC2 in a control unit CU. Logic network RC2 has a pair of output leads 18, 19 terminating at a switching network UD2, with branches 20, 21 extending to switching network UD1. Leads 18 and 19 (as well as 20 and 21) are energized by the network RC2 in combinations determined by the value of the selected number $n$, as represented by the energization pattern of leads 10 – 13, in the manner shown in columns I – III of FIGS. 3. Thus, for $n = 1$ ($p = 1$) the pattern of energization of leads 18/20 and 19/21 is 0—0; for $n = 2$ or 3 ($p$=2) the pattern is 0–1; for $n$ = 4/7 ($p$=3) it is '—1; for $n$ = 8 – 15 ($p$=4) it is 1–0.

Switching network UD1 has three further input leads, i.e., a wire 51 originating at the output of flip-flop 502, a wire 52 emanating from flip-flop 504, and a wire 53 coming from flip-flop 508. Column V of FIG. 3 shows which of the four input leads 51–54 of this network is through-connected to its output lead 55 in the various stages of energization of conductors 20 and 21, i.e., lead 51 in the case $p = 1$, lead 52 in the case $p = 2$, lead 53 in the case $p = 3$ and lead 54 in the case $p = 4$.

Switching network UD2 also has four input leads 27, 28, 29 and 30 originating at respective stages of a binary frequency divider DF to which clock pulses of cadence $f$ can be supplied from a source CP via a start switch 25 and an input 26. Column IV of FIG. 3 indicates the conditions under which any of these four output leads is connected to bus bar 31 via network UD2, i.e., lead 27 for $p = 4$, lead 28 for $p = 3$, lead 29 for $p = 2$ and lead 30 for $p = 1$. Lead 27, connected directly to divider input 26, transmits the clock pulses at their original frequency $f$, i.e., with a step-down ratio of 1 : 1. Lead 28, connected to the output of the first divider stage, carries pulses of cadence $f/2$. Lead 29, energized by the output of the second divider stage, has a pulse frequency $f/4$. Lead 30, finally, provides a pulse frequency $f/8$ taken from the output of the third divider stage.

A resetting switch 8 serves for manual energization of a flip-flop 7 having a set output 9 which extends to all the interstage switches 6, 6A of the multistage memory constituted by flip-flops 501–516. A branch 22 of conductor 9 extends to an inverting input of a coincidence circuit or AND gate RE whose other input is tied to the reset output 23 of flip-flop 7. Gate RE has its output connected to a biasing input 24 of this flip-flop which is switchable by a pulse on a trigger input 49 in the same manner as are the flip-flops 501–516 upon the energization of their setting inputs. Trigger input 49 of flip-flop 7 is connected to a branch 48 of divider input 26 through a delay line LR whose delay time is a fraction of a clock-pulse cycle.

We shall now describe the operation of the system of FIG. 2 for the transmission of a Walsh function, corresponding to a binary number as selected by means of keyboard TA, over the outgoing line 55 to a distant receiving station not shown.

The operator, either before or after depressing the desired combination of keys, briefly closes the swtich 8 to reset the flip-flop 7 so that conductor 9 is de-energized and all the interstage memory switches 6 and 6A are returned to their normal position $\alpha$. With one or more output leads 32–47 now carrying voltage in accordance with the corresponding Walsh function, the bits of that function are registered in flip-flops 501 – 516 as soon as start switch 25 is closed to transmit the output of pulse source CP via frequency divider DF and switching network UD2 to bus bar 31. The first pulse, which sets those flip-flops whose inputs are energized by the corresponding output leads of logic network RC1, immediately thereafter (having passed through delay line LR) sets the flip-flop 7 since the gate RE has been rendered conductive by the simultaneous energization of lead 23 and de-energization of lead 22. As long as resetting switch 8 remains open, flip-flop 7 maintains its set state in which the voltage on conductor 9 reverses the switches 6 and 6A into their alternate postion $\beta$ to complete a loop via network UD1 and feedback path 50 for the continuous recirculation of the stored Walsh function. For the lower values of $n$, i.e., with $p < 4$, only some of the memory stages 501 – 516 are included in that circuit by the selective connection of input lead 51, 52 or 53 to output lead 55 of network UD1. Under these conditions, too, the pulse rate on bus bar 31 is a fraction of the basic clock frequency $f$. Thus, only two pulses per period T appear on bus bar 31 in the case of $p = 1$ to read out the contents of flip-flop 501 and 502 by way of lead 51 to the network UD1 for the transmission over line 55 and recirculation via feedback path 50. With $p = 2$ the first four flip-flops 501 – 504 are connected in the circuit by way of lead 52, the stepping rate in this case being four pulses per period T. With $p = 3$ the connection includes the lead 53 and embraces the flip-flops 501 - 508; there are eight stepping pulses per period. Only with $p = 4$, i.e., upon selection of any number $n$ from 8 through 15, do all sixteen flip-flops 501 – 516 participate in the storage and recirculation of the Walsh function over lead 54 on being stepped at the rate of 16 pulses per period T.

It will therefore be seen that in all instances the recirculation period of dynamic memory 501 – 516 will be exactly equal to the function period $T = mf$ ($m = 16$).

Switches 8 and 25 could be coupled with each other, mechanically or otherwise, so that (e.g., upon depression of a pushbutton) the switch 8 is momentarily closed prior to or concurrently with the selective energization of leads 10 – 13, this being followed by the closure of switch 25 (e.g., upon release of the pushbutton). The transmission of the selected Walsh function over the line 55 continues until switch 25 is reopened to disconnect the pulse source CP. If desired, such disconnection may take place automatically after one or more periods T under the control of a timer or pulse counter. Also, a synchronization pulse may be transmitted over outgoing line 55 to the distant terminal at the beginning (or end) of each period T.

The logical circuitry of networks RC2, UD1 and UD2 is relatively simple and may be readily realized by conventional gating circuits on the basis of the table given in FIG. 3. However, logic network RC1 is substantially more complex and will now be described in greater detail with reference to FIG. 4.

As shown in that Figure, input leads 10 – 13 carrying the coefficients $a_3$, $a_2$, $a_1$ and $a_0$ to a matrix TP serving as a binary multiplier, this matrix having four output leads 32, 73, 74 and 75 carrying respective bits $a'_3$, $a'_2$, $a'_1$, $a'_0$ of an upshifted binary code.

FIG. 5 shows the relationship between input coefficients $a_0 - a_3$ and output coefficients $a'_0 - a'_3$ for different values of $n$ and $p$. With $p = 4$, the value of $a_2$ is 1 and the four voltages on input leads 10 – 13 are transmitted unchanged to the respective output leads 32 and 73 – 75 so that $a_3 = a'_3 = 1$, $a_{22} = a'_2$, $a_1 = a'_1$ and $a_0 = a'_0$. With $p = 3$ and $a_3 = 0$, the coefficients are upshifted by one binary position (corresponding to a multiplication by 2) so that $a'_3 = 1$, $a'_2 = a_1$ and $a'_1 = a_0$; the value of output coefficient $a'_0$ is now of no significance since the flip-flops 509 – 516 controlled by lead 75 are ineffectual under these circumstances, yet from the logical relationship given below it follows that here, too, $a'_0 = a_0$. With $p = 2$ we have two upshifts so that $a'_3 = 1$ and $a'_2 = a_0$; the here insignificant output digits $a'_1$ and $a'_0$ have the values 0 and $a_0$, respectively. With $p = 1$, finally, a $a'_3 = 1$; the insignificant values of coefficients $a'_2$, $a'_1$ and $a'_0$ are 1, 0 and 1, respectively. These insigificant values have been placed between brackets in FIG. 5.

From FIG. 5 it will be clear that lead 32, extending directly to switch 6A as shown in FIG. 2, is always energized since $a'_3$ is invariably equal to 1. Its companion lead 33 is tied to lead 32 through an inverter 56 so as to be invariably de-energized. Branches 71 and 72 of leads 32 and 33 extend to respective Exclusive-OR gates 57 and 58 whose other inputs are tied to lead 73 and whose outputs are the leads 34 and 35. In an analogous manner, branches of leads 32 – 35 extend to respective Exclusive-OR gates 59 – 62 having other inputs tied in parallel to lead 74 and having outputs represented by leads 36 – 39. Similarly, leads 32 – 39 have branches terminating at respective Exclusive-OR gates 63 – 70 with other inputs connected in parallel to lead 75 and with outputs constituted by leads 40 – 47. Inverter 56 and gates 57 – 70 form part of an algorithmic coder AC.

The binary multiplier TP is again a relatively simple logical circuit performing the following Boolean operations:

$$a'_3 = 1 \qquad (2)$$

$$a'_2 = a_0 \cdot \overline{a}_2 \cdot \overline{a}_3 + a_1 \cdot a_2 \cdot \overline{a}_3 + a_2 \cdot a_3 \qquad (3)$$

$$a'_1 = a_1 \cdot a_3 + a_0 \cdot a_2 \cdot \overline{a}_3 \qquad (4)$$

$$a'_0 = a_0 \qquad (5)$$

Obviously, the continuous energization of lead 32 as per equation (2) could also be carried out independently of multiplier TP. By the same token, the constantly de-energized lead 33 need not have any physical existence. Gates 57, 61 and 69, with input connection to lead 33, may thus also be simply omitted; gates 58, 62 and 70, with input connections to lead 32, may be replaced by plain inverters.

It can be readily shown that the pattern of energization of leads 34 – 47 by Exclusive-OR gates 57 – 70, in response to the voltage distribution on leads 73 – 75, conforms exactly to the corresponding bits of the several Walsh functions in column III of FIG. 1 (for $n > 1$). It will also be noted that the generation of this pattern of energization is virtually instantaneous, upon the selective energization of input leads 10 – 13, and results in the immediate read-out of the temporal Walsh function $w_n(t)$ as soon as source CP (FIG. 2) is activated by operation of start switch 25.

We claim:

1. A system for generating, on an outgoing line, binary pulse trains with assigned numerical values ranging from 1 through $m-1$ with $m = 2^{k+1}$, k being an integer greater than 1, comprising:

logical circuitry with k+1 input leads and with at least $m-2$ output leads for converting a chosen binary number, represented by selective energization of said input leads, into an equivalent Walsh function represented by energization of certain of said output leads;

memory means with m stages, at least $m-2$ of said stages being provided with loading connections to respective output leads of said circuitry;

a source of $k+1$ pulse sequences with repetition frequencies subharmonically related to a basic pulse frequency $f$;

first switching means connected to said input leads for determining from the energization pattern thereof the rank $p$ of the highest-ranking finite bit of the chosen binary number and for completing an output connection to said outgoing line for the serial read-out of a group of $2^p$ consecutive stages of said memory means; and second switching means connected to said source for applying a pulse sequence of repetition frequency $f/2^{k+1-p}$ to respective stepping inputs of said group of $2^p$ stages.

2. A system as defined in claim 1, further comprising a feedback path extending from said outgoing line to the first stage of said memory means for periodically recirculating the contents of said $2^p$ stages with an invariable recurrence period $T = m/f$.

3. A system as defined in claim 2, further comprising interstage switchover means in said memory means initially settable to connect said stages to said output leads and start means for reversing, said switchover means upon selective energization of said input leads to disconnect said output leads from said stages and to connect said stages in cascade with one another and with said feedback path.

4. A system as defined in claim 3, further comprising resetting means for restoring said switchover means to reconnect said output leads to said stages prior to reoperation of said start means.

5. A system as defined in claim 4 wherein said resetting means comprises a supply of control voltage for said switchover means and a first switch for establishing a first level of said control voltage, said start means comprising a second switch for activating said source and circuit means for the delayed application of the first pulse from said source to said supply for establishing a second level of said control voltage.

6. A system as defined in claim 1 wherein said logical circuitry comprises a binary multiplier for upshifting the bits of said binary number by $k+1-p$ digital positions, and a coding matrix responsive to the upshifted bits for energizing said output leads.

7. A system as defined in claim 6 wherein said coding matrix comprises a set of Exclusive-OR gates.

8. A system as defined in claim 1 wherein said source comprises a binary frequency divider.

* * * * *